Feb. 11, 1941.   R. H. LOYLESS   2,231,342
COTTON DRIER
Filed June 18, 1938

Inventor
ROY H. LOYLESS.
Jesse R. Stone
Lester B Clark
By
Attorneys

Patented Feb. 11, 1941

2,231,342

UNITED STATES PATENT OFFICE 2,231,342

COTTON DRIER

Roy H. Loyless, Galveston, Tex., assignor of one-half to F. J. Herbelin, Galveston, Tex.

Application June 18, 1938, Serial No. 214,407

2 Claims. (Cl. 34—15)

The invention relates to a cotton drier of a type wherein the rate of travel of the cotton and the amount of air for drying can be accurately adjusted and controlled.

In the drying of cotton it is essential that the moisture arising from the cotton be permitted to escape from the drier because if the air inside of the drier becomes saturated, then, of course, no further moisture can escape from the cotton and no drying effect is obtained; whereas, if the moisture can escape and dry air enter the housing of the drier, then of course the drying operation will progress rapidly.

It is one of the objects of the invention to provide a vent for cotton driers so that the humid air may arise throughout the length of the drier.

Another object of the invention is to adjust the baffles or pathway over which the cotton is to travel so that it may travel at any desired uniform rate, or the rate of travel may be varied at any point throughout the drier.

Another object of the invention is to provide individual adjustable baffles in a cotton drier.

Still another object of the invention is to provide adjustable air nozzles for a cotton drier so that the volume of air being introduced at any stage of the drying operation may be controlled.

Still another object of the invention is to provide a combination baffle and air valve, the opposite sides of which are adjustable to adjust the rate of travel and the volume of air admitted respectively.

It is also an object of the invention to be able to adjust the nozzle and the baffle so that if the cotton is too heavy and too moist, it will not travel up over the baffle because of the adjusted inclination thereof and because of the volume of air admitted, until the cotton has been dried at least a predetermined amount.

Other and further objects of the invention will be readily apparent when the following description is considered in connection with the accompanying drawing, wherein, Fig. 1 is a vertical sectional view of the cotton drier embodying the invention and illustrating the arrangement for adjusting the parts.

Figure 1:
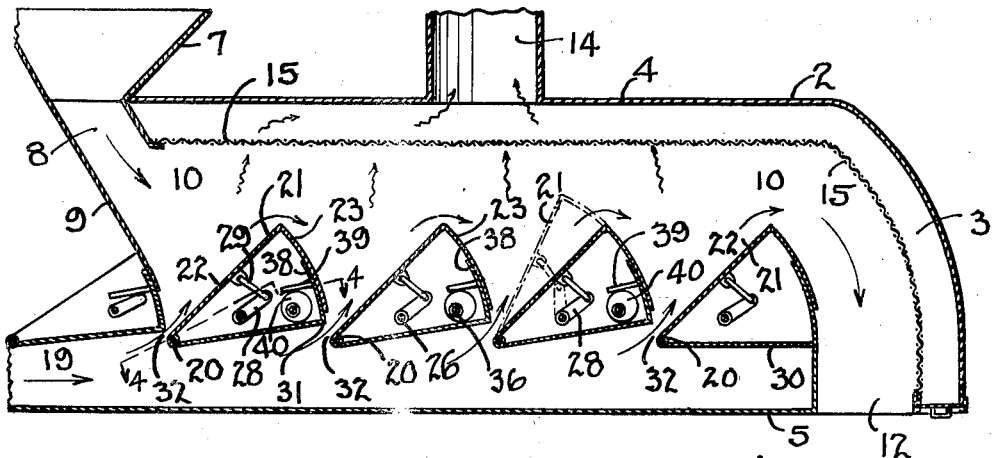
Figure 2:
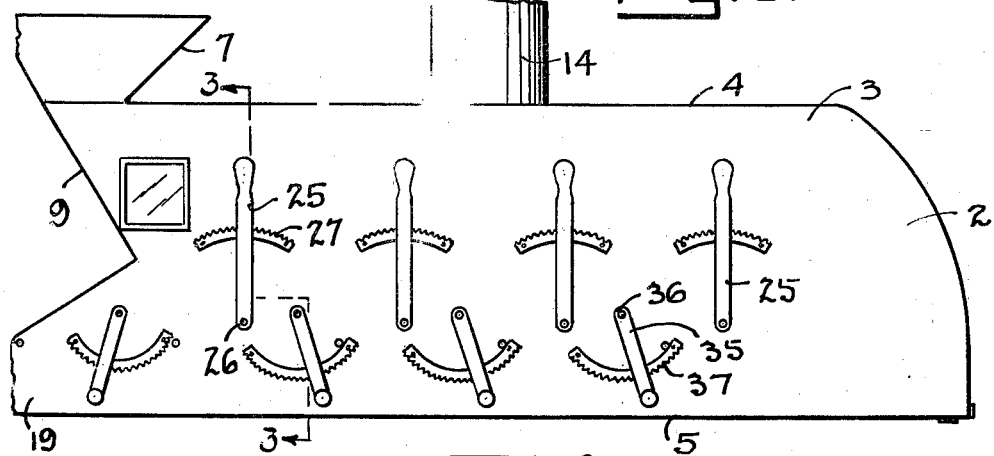
Fig. 2 is a side elevation of the housing, showing the levers for adjusting the air nozzles and the baffles.
Figures 3, 4:
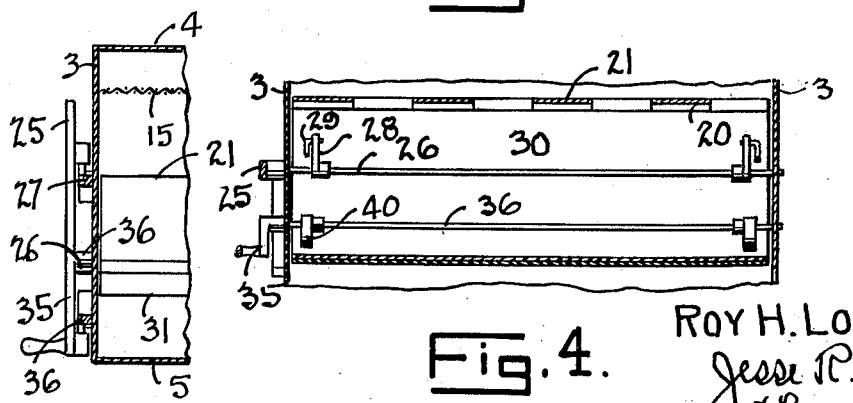
Fig. 3 is a broken section taken on the line 3—3 of Fig. 2.
Fig. 4 is an inclined section taken through the pivot for the baffle and the air valve and illustrating the mechanism for adjusting these parts.

In Fig. 1 the housing is illustrated generally at 2 and includes the spaced side walls 3, which are joined together by the top 4 and the bottom 5.

An entrance chute or hopper 11 is shown at the left whereby the cotton may flow by gravity into the entry 8.

The cotton entering the housing will slide along the end wall 9 into the drier chamber 10. This chamber may be of any desired length and width and is shown as being substantially rectangular in configuration.

It is intended that hot air will be applied to the cotton as it travels through the chamber until it discharges from the outlet 12.

In order that moisture being driven off of the cotton may escape, a vent 14 has been provided in the top 4 of the housing. This vent is of considerable size and it will be noted that it is intermediate the ends of the chamber 10 so that the moist air rising from the cotton may readily escape and screen 15 may be spaced from the top 4 so that any cotton which may arise with the currents of air will not escape through the vent 14.

In order to determine the rate of travel of the cotton through the drier, a plurality of combination baffles and air valves have been inserted in the base of the housing to form a pathway for the cotton. These several combination baffles and air valves are substantially identical and one of them will therefore be described.

An air inlet 19 is shown above the bottom 5. A shaft or rod 20 extends across the chamber 10 between the side walls 3. This shaft has pivotally mounted thereon the baffle member 21 which is in the form of a sheet of metal which has a face 22 thereon to receive the cotton from the inlet 8. This baffle has a skirt portion 23 which is forwardly and downwardly inclined, as seen in Fig. 1. In order to adjust the inclination of the face 22, a lever 25 is pivoted at 26 to the side of the housing and its position may be adjusted by means of a sector 27.

Inside of the housing an arm 28 is connected to the link 29 which is in turn pivoted to the baffle plate 21. It seems obvious by moving the lever 25, the inclination of the face 22 may be adjusted, as seen in the dotted line position in Fig. 1.

Naturally if the inclination of the face 22 is greater, it will require a greater force to drive the cotton upwardly along this face but the rate of travel will be slower if the applied force is the same.

In order to adjust the volume of air which is admitted to the drier, the bottom portion of the combination baffle and air valve is also made adjustable and includes the valve member 30. This member is in the form of a plate which has a corner 31 thereon which is relatively adjustable with respect to the shaft 20 of the next adjacent combination baffle and air valve. In this manner a nozzle or valve opening 32 is provided between the adjusting devices. This air valve 30 is adjustable by means of the lever 35 which is pivoted at 36 to the side of the housing and operates on a sector 37. An upstanding flange 38 on the valve member underlies the skirt 23 on the baffle member 21 so that the triangular area between the baffle and the air valve is closed at all times against the entry of cotton. A flange 39 on the inside of the valve member is arranged to carry the eccentric 40 which is fixed to the lever 35. In this manner the corner 31 may be adjusted to determine the size of the nozzle 32 and may be forced up or down to obtain the desired adjustment.

In operation the baffle and the valve will be adjusted in accordance with the amount of drying which is to be obtained. These adjustments will vary with the type of cotton, with the humidity of the surrounding air, and with the amount and rate of drying which is to be accomplished. It should be noted that air at the same temperature is introduced all along the drier at each nozzle so that as great a drying effect can be obtained at any point desired. A door to remove trash from above the screen is shown near the exit 12.

If the cotton is damp and heavy, the inclination of the face 22 may be so adjusted in accordance with the amount of adjustment of the nozzle 32 so that the cotton will not be carried upwardly along the inclined face 22 by the jet of air until it has dried at least a predetermined amount. Thus, the jet of air may have insufficient force to carry the cotton upward when it first lands on the face 22, but as the cotton is dried by the blast of air, its weight will be reduced and eventually it will be carried upwardly along the path. The moist air arising from the cotton will pass through the screen 15 and out the vent 14 so that the humidity in the drier will at all times be below saturation point.

Each of the individual nozzles 32 can be individually adjusted, as can the baffles so that the inclination of the first baffle may be greater and the next succeeding baffles adjusted to obtain the amount of drying. In some instances the forward baffles may be adjusted to a greater angle while the latter baffles will be adjusted to a lesser angle, while in other instances this arrangement may be reversed. Various adjustments can be applied to the air nozzles so that the arrangement of the cotton drier as a whole affords the operator a great deal of flexibility in adjustment to obtain the exact procedure in drying which is based considerably on the type of cotton being dried. The cotton may be dried quickly or slowly. It may travel to the drier at a rapid rate or as slow a rate as desired.

Broadly, the invention contemplates a cotton drier wherein adjustments may be had to determine the rate and amount of drying and wherein the moisture may readily escape from the drier.

What is claimed is:

1. A drier for fibrous material including a housing, spaced inlet and outlet openings in the housing for material to be dried, a plurality of paired deflector members and valve members pivotally mounted transversely of the housing between said openings and intermediate the top and bottom of the housing forming an upper drier chamber between said openings and an air chamber beneath said members, there being an air inlet to said air chamber and an air vent from said drier chamber, means for adjusting the angle of inclination of the deflector members, and means for adjusting the position of the valve members to control the size of the air passage between successive pairs of members.

2. A drier for fibrous material including a housing having an inlet and an outlet for material to be dried, a plurality of deflector members pivotally mounted in parallel relation transversely of the housing, means for varying the inclination of the deflector members, a valve member pivotally mounted beneath each of said deflector members and extending transversely of the housing, means for independently adjusting the valve members to vary the passage between such member and the adjacent deflector member, said deflector and valve members being intermediate the top and bottom of the housing to form a drier chamber above and an air chamber beneath said members, an air inlet to said air chamber and a vent in said drier chamber for passage of air through the valved passages to move the material between the inlet and outlet and to dry such material during movement.

ROY H. LOYLESS.